United States Patent
Weber

(10) Patent No.: US 6,320,332 B1
(45) Date of Patent: Nov. 20, 2001

(54) RASTER DISTORTION CORRECTION CIRCUIT

(75) Inventor: Rudolf Weber, Meilen (CH)

(73) Assignee: Thomson Licensing S.A., Boulogne Cedex (FR)

(*) Notice: Subject to any disclaimer, the term of this patent is extended or adjusted under 35 U.S.C. 154(b) by 0 days.

(21) Appl. No.: 09/658,169

(22) Filed: Sep. 8, 2000

Related U.S. Application Data

(60) Provisional application No. 60/158,557, filed on Oct. 8, 1999.

(51) Int. Cl.[7] .................................................. G09G 1/04
(52) U.S. Cl. ......................... 315/371; 315/370; 315/396
(58) Field of Search .................................. 315/371, 370, 315/364, 408, 396, 399

(56) References Cited

U.S. PATENT DOCUMENTS

| | | | |
|---|---|---|---|
| 4,206,388 | 6/1980 | Ishigaki et al. | 315/371 |
| 4,254,365 | 3/1981 | Knight | 315/371 |
| 4,429,257 | 1/1984 | Haferl | 315/371 |
| 4,634,937 | 1/1987 | Haferl | 315/371 |
| 4,682,085 * | 7/1987 | Haferl et al. | 315/371 |
| 4,719,392 * | 1/1988 | Haferl | 315/371 |
| 4,780,648 * | 10/1988 | Haferl | 315/371 |
| 4,794,307 * | 12/1988 | Haferl | 315/371 |
| 4,890,043 | 12/1989 | Davie | 315/408 |
| 4,906,902 | 3/1990 | Haferl | 315/371 |
| 4,965,496 | 10/1990 | Haferl | 315/371 |
| 5,115,171 | 5/1992 | Haferl | 315/371 |
| 5,194,784 * | 3/1993 | Tripod | 315/371 |
| 5,323,092 | 6/1994 | Helfrich et al. | 315/371 |
| 5,399,945 | 3/1995 | Haferl et al. | 315/371 |
| 5,841,248 | 11/1998 | Haferl et al. | 315/371 |

* cited by examiner

*Primary Examiner*—Haissa Philogene
(74) *Attorney, Agent, or Firm*—Joseph S. Tripoli; Harvey D. Fried; Sammy S. Henig

(57) ABSTRACT

A series arrangement of an isolating diode and an East-West switching transistor is coupled between a flyback transformer primary winding and a horizontal deflection output transistor circuit to control retrace energy to obtain an East-West modulation of the deflection current amplitude. A first inductor, a tapped inductor and an S-shaping capacitor are coupled via a switch to form a resonant circuit, during the first half of trace. The tapped inductor includes a portion forming a current path for a deflection current. The tapped inductor develops a voltage that controls the switch. The first inductor, the tapped inductor and the S-shaping capacitor are coupled via the switch to form the trace resonant circuit, during the first half of trace. The trace resonant circuit provides inside pincushion raster distortion correction.

9 Claims, 2 Drawing Sheets

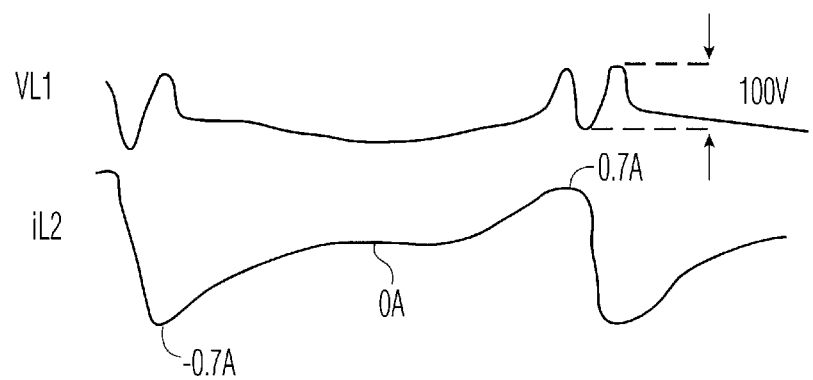
FIG. 2A
FIG. 2B
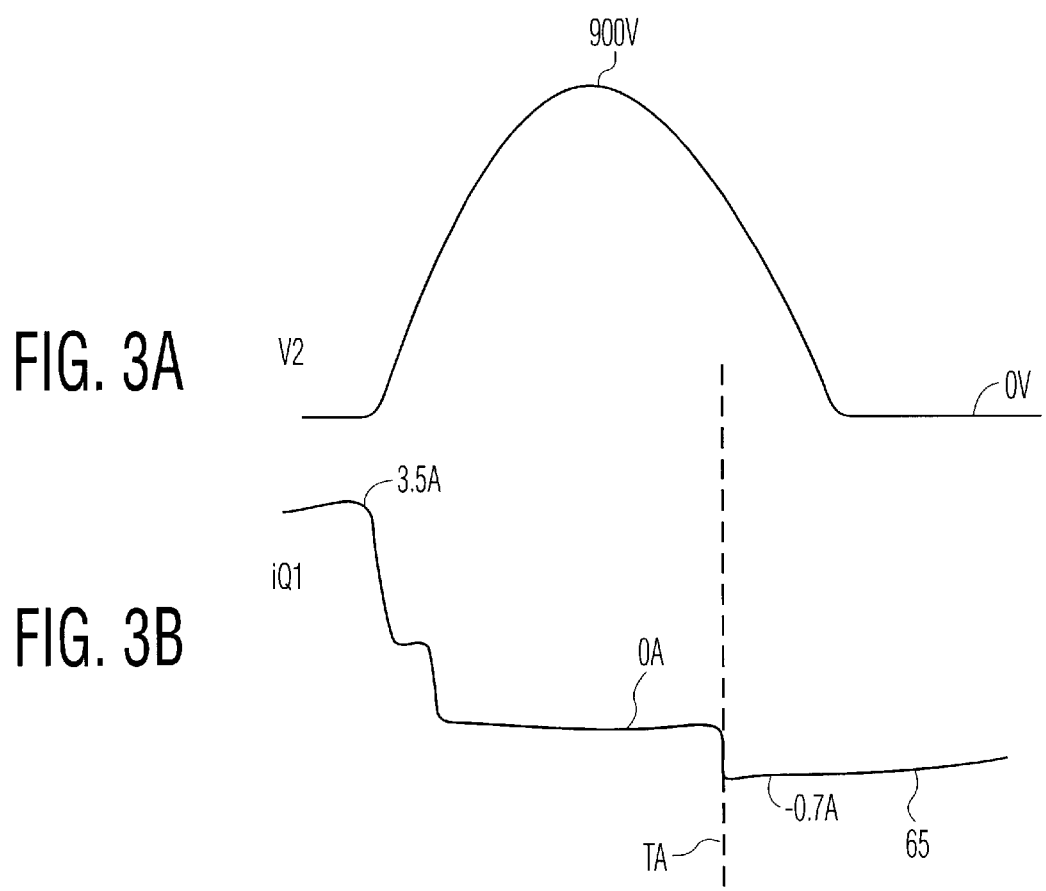
FIG. 3A
FIG. 3B

RASTER DISTORTION CORRECTION CIRCUIT

CROSS REFERENCE TO RELATED APPLICATIONS

This application claims priority of U.S. provisional patent application No. 60/158,557, filed Oct. 8, 1999.

FIELD OF THE INVENTION

The invention relates to a deflection circuit of a video display apparatus. In particular, the invention relates to an inner East-West (E-W) pincushion correction circuit for a cathode ray tube (CRT).

BACKGROUND

Typically, the generation of an ultor or high voltage is accomplished in a flyback transformer which is included in a horizontal deflection circuit. Beam current variations cause modulations of the peak current in a primary winding of the flyback transformer and of the high voltage. Modulation of the primary winding current could produce undesired deflection current modulation. Disadvantageously, high voltage variations may alter the deflection sensitivity and result in raster size variations.

An East-West correction circuit is typically used for correcting outside pincushion distortion. U.S. Pat. No. 5,841,248, entitled, CHARGE CONTROLLED RASTER CORRECTION CIRCUIT in the name of Haferl, et al. (the Haferl, et al. patent) describes an East-West correction circuit that reduces the aforementioned effects of high voltage variations by using an isolating diode coupled between a primary winding of a flyback transformer and an East-West modulation transistor. The East-West modulation transistor is coupled in series with a horizontal output transistor and with the isolating diode.

In a deflection circuit requiring an inside pincushion distortion correction, a trace resonant circuit is, typically, included for modulating the deflection current. An example of an arrangement that includes a resonant circuit for providing inside pincushion distortion correction is shown in U.S. Pat. No. 5,115,171, entitled RASTER DISTORTION CORRECTION CIRCUIT, in the name of Haferl (the Haferl patent). It may be desirable to employ in a deflection circuit having an isolating diode such as described in, for example, the Haferl, et al. patent, a trace resonant circuit that provides inside pincushion distortion correction.

SUMMARY

A video display deflection apparatus, embodying an aspect of the invention, includes a deflection winding included in a first retrace resonant circuit, during retrace. A first switching arrangement is responsive to a first control signal at a frequency related to a first deflection frequency and coupled to a deflection winding and to a supply inductance for generating a deflection current in the deflection winding and a first retrace pulse voltage in the supply inductance. A second switching arrangement is responsive to a second control signal for applying the first retrace pulse voltage to a first inductance, during a controllable portion of retrace, to generate a modulation current in a first trace resonant circuit that includes the first inductance and an S-shaping capacitor. The modulation current varies at a frequency related to a second deflection frequency, in accordance with the second control signal, for providing inside pincushion raster distortion correction. A third switching arrangement is provided for conducting the modulation current in the first trace resonant circuit. A second inductance is coupled in a current path of each of the deflection and modulation currents for generating a current component of the modulation current that renders the third switching arrangement conductive, when trace begins.

BRIEF DESCRIPTION OF THE DRAWINGS

In the drawings:

FIGS. 2a and 2b illustrate waveforms useful for explaining the operation of the circuit of FIG. 1; and FIGS. 3a and 3b illustrate additional waveforms useful for explaining the operation of the circuit of FIG. 1.

DETAILED DESCRIPTION OF THE PREFERRED EMBODIMENTS

Figure 1:
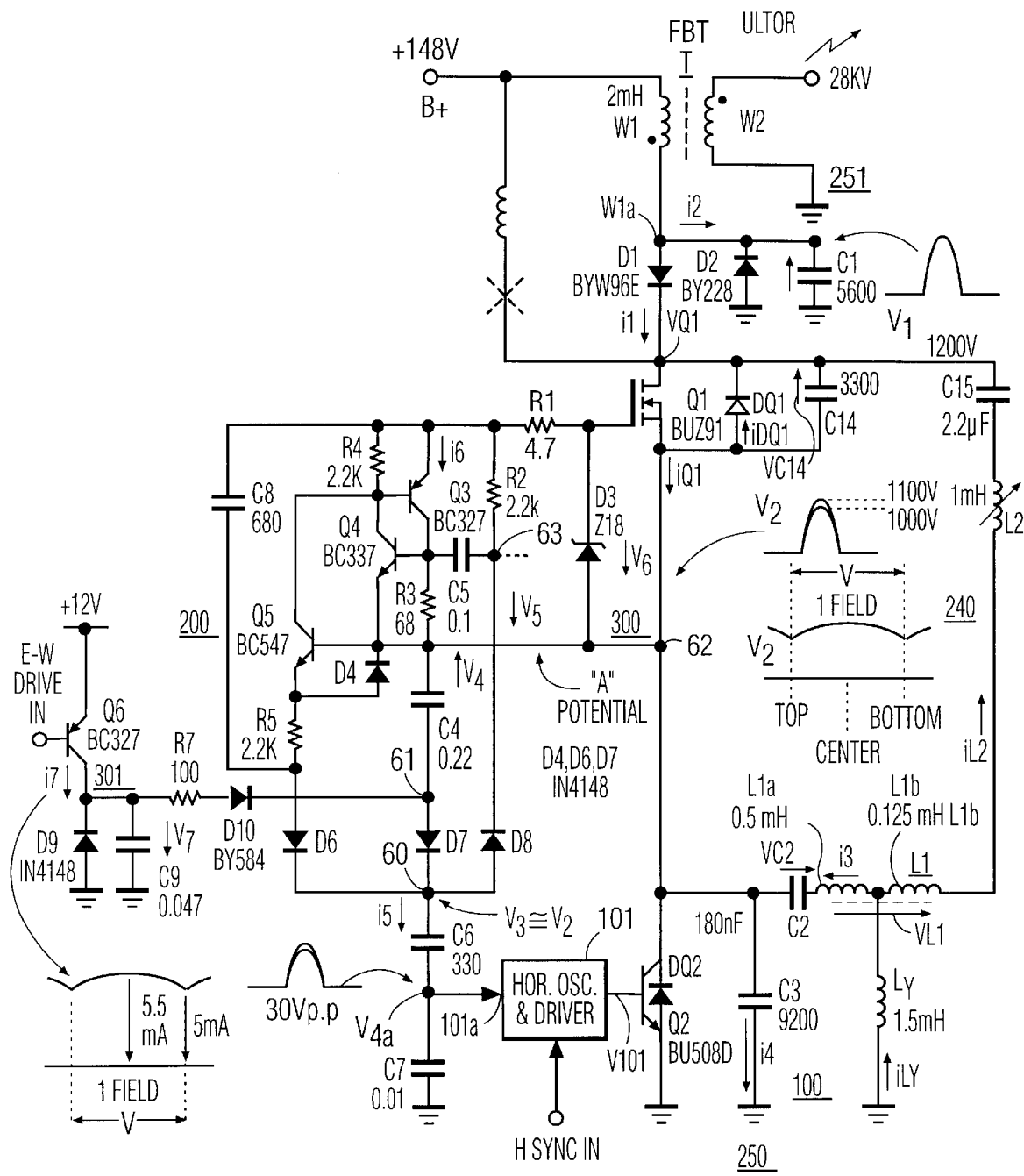
FIG. 1 shows the circuit diagram of a raster corrected horizontal deflection circuit, embodying an aspect of the invention.

A horizontal deflection circuit 250 of FIG. 1 provides horizontal deflection in, for example, a color cathode ray tube (CRT), not shown. Circuit 250 includes a switching transistor Q2 operating at a horizontal frequency $f_H$ that is, for example, about 15,625 KHz in the PAL standard and an anti-parallel damper diode DQ2. Transistor Q2 is controlled by a horizontal rate switching signal V101. A retrace capacitor C3 is coupled in parallel with transistor Q2 and diode DQ2. An S-shaping or trace capacitor C2 is coupled to a deflection winding LY via an inductor LI.

A primary winding W1 of flyback transformer T is coupled between a source of a supply voltage B+ and an anode of an isolation diode D1. A flyback capacitor C1 is coupled to a junction terminal Wla, between diode D1 and winding W1, to form with the inductance associated with winding W1 a flyback resonant circuit 251. A metal oxide semiconductor (MOS) transistor Q1 is coupled in series with transistor Q2. A drain electrode of transistor Q1 is coupled to a cathode of isolation diode D1. A source electrode of transistor Q1 is coupled via a terminal 62 to the collector of transistor Q2 of circuit 250. The switching operation of transistor Q2 produces a deflection current iLY and a retrace voltage V2 at terminal 62. Transistors Q1 and Q2 are conductive during a second half of the trace interval.

Forward regulator transistor Q1 controls the energy applied to deflection circuit 250. An east-west (E-W) control circuit 300 produces a gate voltage V6 of transistor Q1 for controlling switching timing of switching transistor Q1, during retrace. Control circuit 300 operates in a similar manner to that described in the aforementioned Haferl, et al. patent.

At the beginning of the retrace interval, transistor Q2 becomes cut-off. Consequently, a flyback voltage V1 across flyback capacitor C1 and retrace voltage V2 across retrace capacitor C3 start to increase. Transistor Q1 is turned off after transistor Q2 at a controllable instant, during retrace. At the top of the raster, transistor Q1 is turned off early, during horizontal retrace. Toward the center, the turn-off instant occurs late, resulting in a higher deflection current.

During retrace, primary winding W1 current divides into currents i1 and i2. Current i1 flows through transistor Q1 into deflection circuit 250. Whereas, current i2 flows through capacitor C1. The current divides according to the respective impedances in the current paths of currents i1 and i2 and also according the voltage difference between voltages V1 and V2. Current i1 provides the necessary charge to energize deflection circuit 250 for obtaining deflection current iLY modulated at a vertical rate.

Flyback transformer T stores the required energy for the generation of a high voltage ULTOR developed from a high voltage winding W2 of transformer T. Capacitor C1 acts as flyback capacitor for primary winding W1 of flyback transformer T. Energy recovery is provided by a damper diode D2 coupled across capacitor C1. Advantageously, isolation diode D1 avoids energy return via anti-parallel diode DQ1 from deflection circuit 250 into flyback transformer T, during a portion of retrace.

A control stage 101 that includes a horizontal oscillator and a phase detector, not shown in detail in FIG. 1, is responsive to a horizontal synchronizing signal H SYNC IN. Signal H SYNC IN is derived from, for example, a video detector of a television receiver, not shown, and is referenced to a common conductor or ground potential. A retrace voltage V3 produced from retrace voltage V2 is coupled via a capacitor C6 and a capacitor C7 forming a capacitive voltage divider to obtain a low amplitude retrace voltage V4a that is referenced to the common conductor or ground. Voltage V4a is applied to an input 101a of stage 101 to synchronize retrace pulse voltage V2 and deflection current iLY in winding LY to synchronizing signal H SYNC IN of the video signal. Stage 101 that includes a conventional driver stage, not shown, generates switching signal V101 across the base-emitter junction of transistor Q2 for producing a base drive current at the horizontal frequency $f_H$.

A trace resonant circuit formed by deflection winding LY and capacitor C2 has a resonant frequency that is about 6 KHz. Trace capacitor C2 is also coupled via tapped inductor L1 to an inductor L2. Inductor L2, that may be variable for adjustment purposes, is coupled via a capacitor C15 to the drain electrode of transistor Q1. Series coupled inductor L2, capacitor C15, inductor L1 and capacitor C2 form a trace resonant circuit 240, during a trace interval. Resonant circuit 240 is tuned to, for example, 12–14 KHz that is higher than the 6 KHz trace resonance frequency of the trace resonant circuit formed by deflection winding LY and capacitor C2. Trace Resonant Circuit 240 provides inside pincushion distortion correction.

During trace, a resonant current iL2 in trace resonant circuit 240 flows in a current path that includes transistor Q1, when conductive, or by an anti-parallel diode DQ1, when transistor Q1 is nonconductive. Current iL2 in inductor L2 has a higher degree of "S" shaping than that of deflection current iLY in winding LY for providing inside pincushion distortion correction. Current iL2 is developed from a voltage VC2, developed in S-shaping capacitor C2, and is modulated by a flyback voltage VC14 developed across retrace capacitor C14. Flyback capacitor C14 also prevents excessive coupling between flyback transformer T and retrace resonant circuit 250. Flyback voltage VC14 and retrace voltage V2 across retrace capacitors C14 and C3 determine the magnitudes of currents iL2 and iLY, respectively. Currents iLY and iL2 are inverse proportional. For example, a decrease in the amplitude of the retrace pulses of voltage V2 across capacitor C3 is accompanied with an increase in the amplitude of flyback voltage pulses VC14.

Flyback voltage VC14 is amplitude modulated to provide East-West distortion correction. A low amplitude flyback voltage VC14 produces an increased amplitude of current iL2 and a higher modulation of trace voltage VC2. Therefore, more pronounced "S"-shaping of deflection current iLY is accomplished. On the other hand, less pronounced "S"-shaping is obtained at a higher amplitude of flyback voltage VC14.

For enabling proper trace resonant operation in resonant circuit 240 of FIG. 1, anti-parallel diode DQ1 has to be conductive, at the beginning of trace. Because of isolation diode D1, winding W1 is de-coupled from diode DQ1. However, at the beginning of trace current cannot flow via diode DQ1 in a current path that includes winding W1.

FIGS. 2a, 2b, 3a and 3b illustrate waveforms useful for explaining the operation of the circuit of FIG. 1. Similar symbols and numerals in FIG. 1 and in FIGS. 2a, 2b, 3a and 3b indicate similar items or functions.

In carrying out an inventive feature, inductor L1 of FIG. 1 includes an inductance portion L1a that is coupled in series with deflection winding LY, during retrace. During retrace, when retrace voltage V2 of FIG. 3a is developed in capacitor C3 of FIG. 1, a retrace pulse voltage VL1 of FIG. 2a is developed in inductor L1 of FIG. 1. Voltage VL1 of FIG. 2a produces a negative portion 65 of FIG. 3b of a current iQ1 in a current path that includes transistor Q1 and diode DQ1 of FIG. 1 immediately after time TA of FIG. 3b. Time TA occurs prior to the end of retrace pulse voltage V2 of FIG. 3a. Negative portion 65 of FIG. 3b flows in diode DQ1 of FIG. 1 in the direction of the arrow. Negative portion 65 of FIG. 3b of FIG. 3b forces diode DQ1 of FIG. 1 to conduct. It follows that diode DQ1 is conductive, at the beginning of trace. Thereby, advantageously, conductive continuity is maintained in the current path of current iL2 of FIG. 2b FOR ENABLING PROPER TRACE RESONANT OPERATION IN RESONANT CIRCUIT 240 OF FIG. 1.

Disadvantageously, the inductance of inductance portion L1a could produce a distortion in current iLY because it is coupled in series with winding LY. It may be desirable to reduce the inductance, associated with portion L1a of inductor L1 of FIG. 1, during trace. Therefore, an inductance portion L1b is included together with inductance L1a to form a tapped inductor L1. Thus, advantageously, tapped inductor L1 forms an auto transformer for reducing the effective impedance in the current path of deflection current iLY introduced by portion L1a of inductor L1.

In carrying out another inventive feature, instead of producing voltage VL1 of FIG. 2a, an inductor LX of FIG. 1 may be coupled between voltage B+ and the cathode of diode DQ1, as shown in a broken line. Inductor LX provides a current path for current iDQ1, during the first half of trace, following time TA of FIG. 3b. Because of the high impedance of Inductor LX, isolation between resonant circuits 250 and 251 is, advantageously, maintained.

The operation of control circuit 300 is now described. Deflection current iLY divides, during the retrace interval, into a main retrace current i4, flowing through capacitor C3, and into a retrace, sampling current i5 in control circuit 300. Current i5 at a positive polarity flows through a series coupled arrangement of a capacitor C4, a diode D7 and capacitors C6 and C7. Capacitor C6 having the smallest value in the series coupled capacitors determines the amplitude of current i5.

Current i1 in transistor Q1 replenishes the charge in retrace capacitor C3 and in series coupled capacitors C4, C6 and C7, within the first half of the retrace interval, to obtain the desired deflection current amplitude, during the following trace interval. Current i1 determines the peak value of retrace voltage V2 and of deflection current iLY.

At the beginning of retrace, a switch diode D10, that couples an E-W current generating circuit 301 to circuit 300, is cut off by increasing retrace voltage V2. During the first half of the retrace interval, positive current i5 charges, via diode D7, capacitor C4 to develop a ramp voltage V4 in capacitor C4 for sampling deflection current iLY. Current i5 charges capacitor C6 to develop voltage V3, at an upper terminal 60 of capacitor C6. Capacitor C4, C5, C6 and C7 form a capacitive voltage divider to obtain 30V pulse voltage V4a.

During the second half of retrace, negative current i5 discharges capacitor C6 via a diode D8, capacitor C5 and a base-emitter junction of transistor Q4. Advantageously, negative current i5 flows in capacitor C5 via a reactive current path to develop voltage V5 such that power is not dissipated in the process of developing voltage V5. Voltage V5 provides via a resistor R2, that is coupled to the gate of transistor Q1, a gate supply voltage for producing a gate voltage V6. Voltage V6 controls the switching operation of transistor Q1. The value of capacitor C6 determines the amplitude of current i5. The value of capacitor C6 is selected to obtain sufficiently large level of voltage V5 to maintain transistor Q1 in saturation at the narrowest picture width. Voltage V3 equals approximately voltage V2 because voltage V4 is much smaller than voltage V2.

For explanation purposes, voltage V4 across capacitor C4 is referenced to voltage V2, indicated by the letter "A" and associated with the potential at a terminal 62. A voltage developed at a lower terminal 61 of capacitor C4 changes negatively with respect to the "A" potential at terminal 62, thus producing a downramping retrace voltage shape portion. At a corresponding instant within retrace, voltage V2 starts to decrease, thereby turning off diode D7 and turning on diode D8. Diode D8 has an anode that is coupled to terminal 60. As a result, voltage V4 remains constant until the end of retrace. Whereas, at the end of retrace, voltage V2 is near zero volts.

Because of the decrease in voltage V2, voltage V4 across capacitor C4 forward biases diode D10. A current source transistor Q6 of circuit 301 produces an east west modulation current i7. Current i7 varies the turn off timing of transistor Q1 for modulating deflection current iLY in an east-west manner.

Current i7 discharges capacitor C4, during the trace interval. Assume that the positive and negative portions of current i5 are approximately equal. Therefore, current i5 is equal to the discharge current of capacitor C5 which provides the supply current of control circuit 300. Thus, voltage V4 is developed as a result of the charge current via diode D7 and the discharge current via diode DIO. The average value of voltage V4 is constant when the charge and discharge are equal. A comparator transistor Q5 has a base electrode coupled to terminal 62. An emitter electrode of transistor Q5 is coupled via an emitter resistor R5 and a switch diode D6 to terminal 60.

During a portion of the charge interval, down-ramping voltage V4 is applied via conductive diode D7 to transistor Q5 to turn on transistor Q5. The current in the current path that includes resistor R5, conductive diode D6 and transistor Q5 produces an up-ramping collector current in transistor Q5. The collector current in transistor Q5 is coupled to a collector resistor R4 of transistor Q5. When the collector current of transistor Q5 reaches about 0.2 mA, it triggers a regenerative switch formed by the pair of transistors Q3 and Q4 forming a latch. The positive feedback causes transistors Q3 and Q4 to saturate rapidly and to turn off transistor Q1.

Transistors Q3 and Q4 are held in saturation by the discharge current in a capacitor C8. The discharge current of capacitor C8 flows in a current path that includes resistor RS, transistor Q5 and the base-emitter of transistor Q3. During trace, capacitor C8 has been charged to develop a voltage that is approximately equal to voltage V6 or approximately 15V, as explained later on.

The saturation of transistors Q3 and Q4 is maintained until the end of retrace by negative current i5 which flows through diode D8 and charges capacitor C5. At the end of retrace, transistors Q3 and Q4 are self turned off. This is so because the collector current of transistor Q3 is always smaller than the current in resistor R2 if the currents in a gate resistor RI of transistor Q1, in resistor R6 and in transistor Q5 are all zero. Thus, a gate turn-off regenerative switch, formed by transistors Q3 and Q4, is triggered at the crossover points.

Capacitor C6 discharges, during the second half of the retrace interval, via diode D8 and charges capacitor C5 to voltage V5 between 12 Volts and 24 Volts, depending upon the raster width. Voltage V3 at upper terminal 60 of capacitor C6 remains at approximately the level of voltage V5, during the trace interval, after diode D8 becomes non-conductive. Thereby, trace voltage V3 maintains diodes D6 and D7 non conductive. This avoids erroneous triggering of transistor Ql, during trace.

Gate resistor R1 acts as current limiter. A zener diode D3 coupled between the source and gate electrodes of transistor Q1 acts as a voltage limiter. The amplitude of deflection current iLY is determined by the turn off instant of transistor Q1 that is controlled by the crossover point of voltage V4 with the conduction threshold of transistor Q5. An earlier turn-off instant results in low amplitudes of voltage V2 and current iLY. Conversely, a later turn-off instant results in high amplitudes.

Transistor Q6 acts as a current source to make the discharge operation of capacitor C4 independent of variations of the forward voltage of diode D1 0 and of the saturation voltage of transistor Q2. Current i7 charges a capacitor C9, during retrace, when diode D10 is non conductive. Capacitor C9 discharges at the beginning of trace. In this way current i7 discharges capacitor C4 by an amount that is independent of the length of the non-conductive interval of diode D10. Such length may be altered by the turn-off characteristic of transistor Q2. A resistor R7 coupled in series with diode D10 limits parasitic currents caused by negative transient voltage peaks across deflection damper diode DQ2. A protection diode D9 coupled across capacitor C9 provides an additional current path for discharging capacitor C4 to prevent capacitor C4 from being excessively charged when current i7 is too low.

What is claimed is:

1. A video display deflection apparatus, comprising:

a deflection winding included in a first retrace resonant circuit, during retrace;

first switching means responsive to a first control signal at a frequency related to a first deflection frequency and coupled to said deflection winding and to a supply inductance for generating a deflection current in said deflection winding and a first retrace pulse voltage in said supply inductance;

second switching means responsive to a second control signal for applying said first retrace pulse voltage to a first inductance, during a controllable portion of retrace, to generate a modulation current in a first trace resonant circuit that includes said first inductance and an S-shaping capacitor, said modulation current varying, at a frequency related to a second deflection frequency, in accordance with said second control signal, for providing inside pincushion raster distortion correction;

third switching means for conducting said modulation current in said first trace resonant circuit; and a second inductance coupled in a current path of each of said deflection and modulation currents for generating a current component of said modulation current that renders said third switching means conductive, when trace begins.

2. A video display deflection apparatus according to claim 1, wherein said second switching means applies said first retrace pulse voltage to said first retrace resonant circuit, during a controllable portion of retrace, to provide East-West raster distortion correction, in accordance with said second control signal.

3. A video display deflection apparatus according to claim 1, wherein said first switching means and said second switching means comprise first and second switching transistors, respectively, that are coupled in series with said supply inductance, during a portion of trace.

4. A video display deflection apparatus according to claim 1, further comprising an isolation diode coupled to said supply inductance for isolating said supply inductance from said first retrace resonant circuit, during a portion of retrace.

5. A video display deflection apparatus according to claim 1, wherein said second inductance is coupled to a third inductance to form a tapped inductor, and wherein said deflection winding is coupled to a tap of said tapped inductor.

6. A video display deflection apparatus according to claim 1 wherein said second switching means comprises a switching transistor that is nonconductive, at the beginning of trace, and wherein said third switching means comprises an anti-parallel diode.

7. A video display apparatus according to claim 1 wherein said S-shaping capacitor is coupled to said deflection winding to form a second trace resonant circuit.

8. A video display deflection apparatus, comprising:

first switching means responsive to a first control signal at a frequency related to a first deflection frequency and coupled to a deflection winding included in a first retrace resonant circuit for generating a deflection current;

a first inductance coupled to an S-shaping capacitor to form a first trace resonant circuit;

a supply inductance;

second switching means responsive to a second control signal, varying at a frequency related to a second deflection frequency, and coupled to said supply inductance for generating a first retrace pulse voltage in said supply inductance, said first retrace pulse voltage being coupled to said first inductance for generating a modulation current in said first trace resonant circuit to provide inside pincushion raster distortion correction;

an isolating diode for decoupling said supply inductance from said first retrace resonant circuit, during a portion of retrace; and a second inductor for coupling a supply voltage to said second switching means via a current path that excludes said supply inductance and said isolating diode to provide a current path for said modulation current, when trace begins.

9. A video display deflection apparatus, comprising:

a deflection winding included in a first retrace resonant circuit, during retrace;

a first switching transistor responsive to a first control signal at a frequency related to a first deflection frequency and coupled to said deflection winding for generating a deflection current in said deflection winding;

a second switching transistor responsive to a second control signal for coupling a supply inductance to said first retrace resonant circuit, during a controllable portion of retrace for providing East West distortion correction;

an isolating diode for decoupling said supply inductance from said second switching transistor, during a portion of retrace; and a first inductor coupled to an S-shaping capacitor to form a first trace resonant circuit for providing inside pincushion distortion correction, said first trace resonant circuit including a tapped inductor having a terminal that is coupled to said deflection winding, said first trace resonant circuit including a diode that is coupled in an anti-parallel manner across said second switching transistor and that is rendered conductive by a current that flows in said first trace resonant circuit, during a beginning of trace.

* * * * *